United States Patent [19]
Kimoto

[11] Patent Number: 5,382,200
[45] Date of Patent: Jan. 17, 1995

[54] BELT

[75] Inventor: Kanji Kimoto, Kobe, Japan

[73] Assignee: Bando Chemical Industries, Ltd., Kobe, Japan

[21] Appl. No.: 122,658

[22] Filed: Sep. 17, 1993

[30] Foreign Application Priority Data

Sep. 24, 1992 [JP] Japan .................... 4-253325

[51] Int. Cl.⁶ ............................... F16G 1/00
[52] U.S. Cl. ........................ 474/260; 474/268
[58] Field of Search ................. 474/266–268, 474/260–262

[56] References Cited

U.S. PATENT DOCUMENTS 5,230,667 7/1993 Nakajima et al. ............ 474/268 X
5,242,743 9/1993 Nakanishi et al. ........... 474/268 X

FOREIGN PATENT DOCUMENTS 0099205 1/1984 European Pat. Off. .
0213219 3/1987 European Pat. Off. .
0271587 6/1988 European Pat. Off. .
2258650 6/1974 Germany .

Primary Examiner—Michael Powell Buiz
Attorney, Agent, or Firm—Sixbey, Friedman, Leedom & Ferguson; Gerald J. Ferguson, Jr., Tim L. Brackett

[57] ABSTRACT

A belt which prevents generation of cracks and noises at a joint part of a canvas. Tooth faces of tooth parts of a synchronous belt are covered with the canvas. A warp yarn of the canvas is such formed that a necessary number of spun yarns or filament yarns are gathered and given a final twist at many twisting times of 1000–3000 per meter. The warp yarns of the canvas is so composed that a first pair of warp yarns made of an S twist yarn and a Z twist yarn and a second pair of warp yarns made of a Z twist yarn and an S twist yarn are arranged alternately in a belt-width direction. A weft yarn of the canvas is composed of well known spun yarns or filament yarns. The canvas is woven by the warp yarns and the weft yarns and shrunk in hot water so as to stretch in a belt-length direction. As compared with the conventional belt in which a canvas with high-stretchable crimp yarns for weft yarns is such used that the direction of the crimp yarns accords with a longitudinal direction of the belt, the number of joint parts of the canvas by which cracks are caused is reduced.

5 Claims, 5 Drawing Sheets

BELT

BACKGROUND OF THE INVENTION

This invention relates to a belt such as a transmission belt, a synchronous belt or the like.

Conventionally, there has been known a transmission belt such as a wrapped V belt, a raw-edged V belt, a V-ribbed belt or the like. For reinforcement of such a transmission belt, a canvas for belt is used. In general, a woven fabric made of cotton fibers, a woven fabric made of chemical fibers (nylon 6, nylon 6,6, polyester, aramid) or a woven fabric made of blended yarns of cotton fibers with chemical fibers (cotton-nylon 6, cotton-nylon 6,6, cotton-polyester, cotton-aramid) is used as the canvas for belt.

In the woven fabric used as the canvas for belt, a warp yarn and a weft yarn are small and approximately equal to each other in stretching. Therefore, the woven fabric is used in form of a commonly called bias canvas. In detail, the bias canvas is formed in such a manner that an original sized canvas is cut bias to incline the warp yarn and the weft yarn at 90°–130° in a longitudinal direction of a belt, as well known in the prior art.

When the woven fabric is applied to a belt the length of which is longer than the width of the original sized canvas. it is required to form a canvas for belt in such a manner as to join the woven fabrics to one another.

In such a case, not only processes for forming the woven fabrics into a bias canvas are increased and complicated, but cracks easily generate in a joint part in which the woven fabrics are jointed to one another, which shortens a belt life.

In case that the woven fabric is used as a covering canvas composing an outer portion of a V-ribbed belt or the like, noises easily generate at a joint part (a level difference part) in which the woven fabrics are jointed to one another when the covering canvas receives a tension against the outer portion of the belt. In addition, since stretchings of the warp yarn and the weft yarn are unbalanced, the belt is apt to meander, i.e., move in a belt-width direction, or tumble.

Further, in a synchronous belt, there has been known a reinforcing canvas which is used at tooth-bottom faces of tooth parts and is woven, using high-stretchable crimp yarns in a longitudinal direction, as disclosed in Japanese Utility-Model Open Gazette No. 60-16037. More generally, there has been known a canvas for belt in which high-stretchable crimp yarns are used in a lateral direction of the woven fabric and the lateral direction of the woven fabric is made to accord with a longitudinal direction of the belt.

In case where a woven fabric is used as a canvas for belt, two or more joint parts exists in the canvas for belt when the length of the belt is longer than the width of the woven fabric. This presents a breakdown of the synchronous belt at the joint parts, thereby resulting in a shortened belt life. Further, since the woven fabric is so woven that the warp yarns in which all final twists are either S twists or Z twists are paralleled with one another, the belt easily meanders, thereby further shortening a belt life.

SUMMARY OF THE INVENTION

The present invention has its object of providing a belt in which generation of cracks and noises caused at a joint part of a canvas are prevented.

A belt of the present invention comprises: a belt body; and a canvas composed of a warp yarn and a weft yarn for covering said belt body in such a manner that the warp yarn accords with a longitudinal direction of the belt, wherein the warp yarn of the canvas is composed of a necessary number of spun yarns or filament yarns gathered and given a final twist at 1500-3000 times per meter, the weft yarn is composed of spun yarns or filament yarns, the canvas is such woven that a first pair of warp yarns made of an S twist yarn and a Z twist yarn and a second pair of warp yarns made of a Z twist yarn and an S twist yarn are arranged alternately in a belt-width direction, and the canvas is shrunk in hot water so as to have a large stretchability in a longitudinal direction of the belt.

According to the belt of the present invention, the direction of the warp yarns accords with a longitudinal direction of the belt, the warp yarn of the canvas is such formed that a necessary number of spun yarns or filament yarns are gathered and given a final twist at 1500-3000 times per meter, and the canvas is such woven that a first pair of warp yarns made of an S twist yarn and a Z twist yarn and a second pair of warp yarns made of a Z twist yarn and an S twist yarn are arranged alternately in a belt-width direction. Thereby, the stretchability in a longitudinal direction of the canvas (i.e., a belt-length direction) can be enhanced, and the number of joint parts of the canvas is reduced as compared with the conventional belt, so that generation of cracks and noises caused at the joint part can be prevented. In particular, since a first pair of warp yarns made of an S twist yarn and a Z twist yarn and a second pair of warp yarns made of a Z twist yarn and an S twist yarn are arranged alternately in a belt-width direction, a meandering motion and a lateral tumble of the belt can be restrained.

The belt of the present invention is applied to a synchronous belt having tension cords provided inside of a belt body thereof and tooth parts formed at regular intervals at a lower part thereof, and a V-ribbed belt having tension cords provided inside of a belt body thereof and plural ribs formed at a lower part thereof.

In case of the V-ribbed belt, a warp yarn is such formed that a necessary number of spun yarns of 60–10 yarn number are gathered and given a final twist at 1500-2500 times per meter, and twisting times of S twist warp yarn are approximately 10-20 percent more than that of Z twist warp yarn. A weft yarn is such formed that a necessary number of spun yarns of 40-7 yarn number are gathered and given a final twist at 40-200 times per inch.

BRIEF DESCRIPTION OF THE DRAWINGS

Accompanying drawings show preferred embodiments of the present invention. In the drawings.

DESCRIPTION OF THE PREFERRED EMBODIMENTS

Detailed description is made below about embodiments of the present invention with reference to the accompanying drawings.

FIRST EMBODIMENT

A belt of the present embodiment is applied to a synchronous belt.

Figure 1:
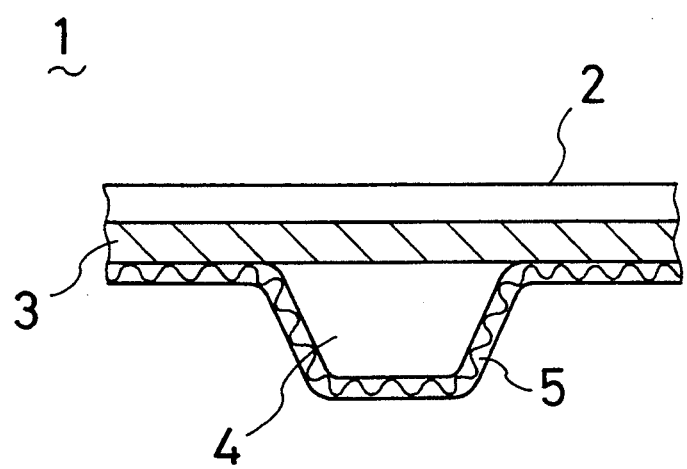
FIG. 1 is a front view showing a part of a synchronous belt.

In FIG. 1 showing a schematic structure of a synchronous belt, reference numeral 1 designates the synchronous belt, wherein a belt body 2 has tension cords 3 thereinside and tooth parts 4 formed at regular intervals at a lower part thereof and tooth faces of the tooth parts 4 are covered with a canvas 5. The canvas 5 is woven by warp yarns 6a, 6b and weft yarns 7, wherein a warp yarn 6a, 6b has an excellent stretchability and is oriented in accordance with a belt-length direction.

Figure 2:
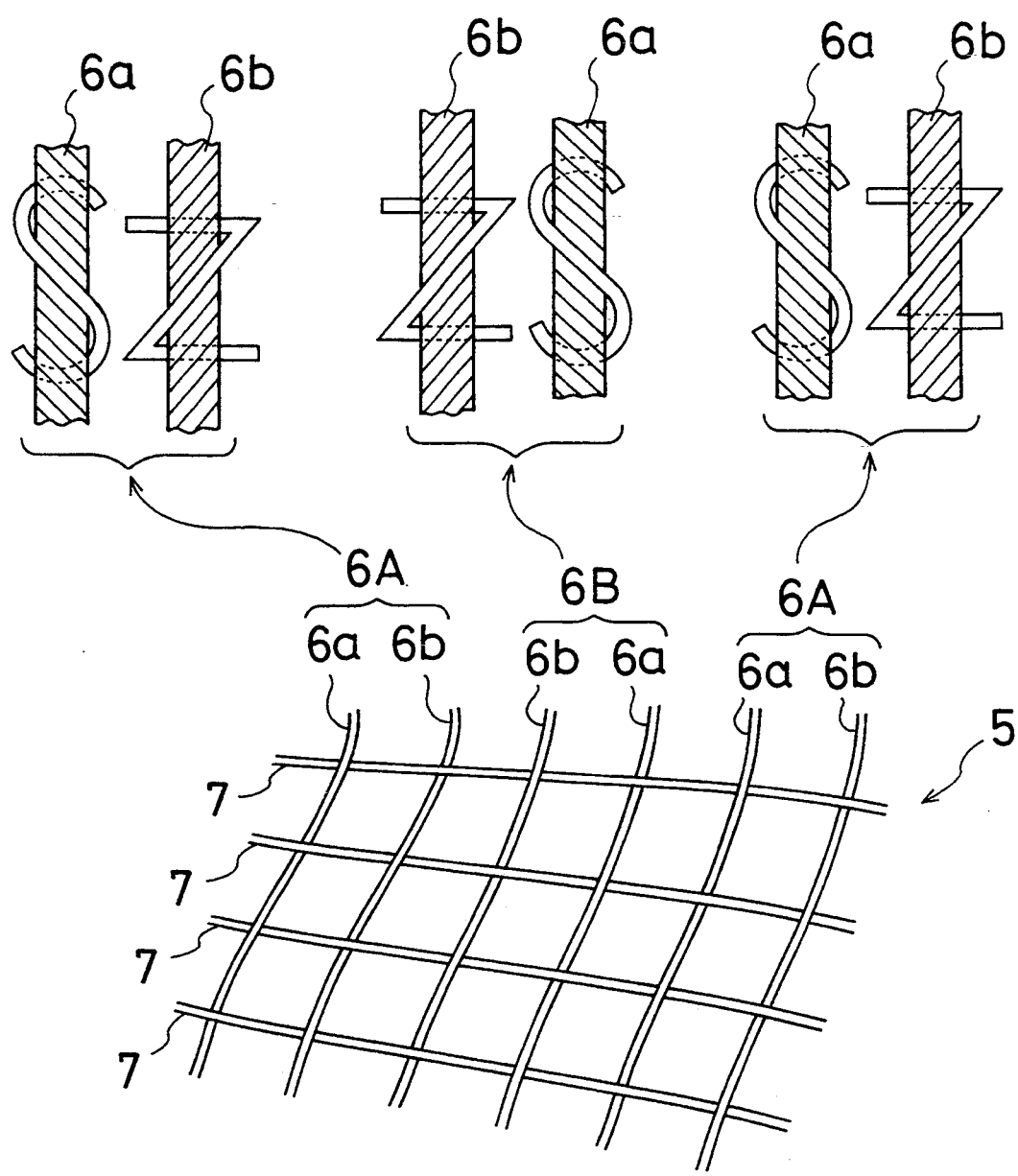
FIG. 2 is an explanatory diagram of a canvas.

As shown in FIG. 2, the warp yarn 6a, 6b of the canvas 5 is composed of a necessary number of spun yarns or filament yarns gathered and given a final twist at many twisting times of 1500 to 3000 per meter. A first pair of warp yarns 6A made of an S twist yarn 6a and a Z twist yarn 6b and a second pair of warp yarns 6B made of a Z twist yarn 6b and an S twist yarn 6a are arranged alternately in a belt-width direction. The weft yarn 7 is composed of spun yarns or filament yarns which have less stretchability. The warp yarn 6a, 6b and the weft yarn 7 are woven by a power loom or a high-speed loom as well known to be formed into a woven fabric. The woven fabric is shrunk in hot water to make the plane weave canvas 5 further stretching in a longitudinal direction of the belt. Then, the canvas 5 undergoes a well known treatment, i.e. a dip treatment by an adhesive which resorcin, formaldehyde and latex are condensed thus serving as a canvas for belt.

The following Table 1 shows an example of a canvas according to a belt of the present invention together with an example of a conventional canvas.

TABLE 1

|  | an example of the present invention | a conventional example |
|---|---|---|
| Construction |  |  |
| warp yarn | 70 d/2 × 2 | 70 d/3 |
| weft yarn | 210 d/1 | 140 d/2 |
| Twisting times (times/10 cm) |  |  |
| warp yarn | S twist: 2200 Z twist: 2000 | S twist: 40 |
| weft yarn | S twist: 40 | S twist: 20 |
| Density (number/inch) |  |  |
| warp yarn | 65 | 95 |
| weft yarn | 110 | 72 |
| Strength (kgf/3 cm) |  |  |
| warp yarn | 75 | 120 |
| weft yarn | 220 | 100 |
| Elongation (%) |  |  |
| warp yarn | 160 | 35 |
| weft yarn | 40 | 140 |
| 50% Modulus (kgf/3 cm) | 0.2 (longitudinal direction of canvas) | 0.5 (lateral direction of canvas) |

For material of the canvas, spun yarns or filament yarns each made of chemical fiber such as cotton, nylon 6, nylon 6,6, polyester or aramid, or blended yarns of such chemical fibers can be used. For a method of weaving, a plain weave, a twill weave, a satin weave or the like is available.

In a conventional fabricating process of the canvas, filament fibers are given a false twist, heated by the vicinity of melting point, woven into a canvas and then shrunk as well known. Unlike the conventional process, in a fabricating process of the canvas of the present invention, the final twist time of spun yarns or filament yarns composing the warp yarns 6a, 6b is more than that of the conventional process, a woven fabric is such formed that the first pair of warp yarns 6A made of a S twist yarn 6a and a Z twist yarn 6b and a second pair of warp yarns 6B made of a Z twist yarn 6b and a S twist yarn 6a are arranged alternately in a belt-width direction, and the woven fabric is shrunk in hot water. This prevents the belt from meandering and presents a stretchability capable of sufficiently standing a use for belt. Accordingly, it is not required that a canvas having high-stretchable crimp yarns as weft yarns is such used that the direction of the crimp yarns accords with a longitudinal direction of the belt as in a conventional belt.

When a synchronous belt is made by using the canvas of the present embodiment, for example, the canvas to be used as a covering canvas is wound on a toothed cylindrical mold such that the warp yarns can be oriented in a peripheral direction of the mold, tension-resistance codes are spur therearound, an unvulcanized rubber sheet of a set thickness is wound thereon, and a rubber is formed into tooth grooves of the cylindrical mold together with stretching the canvas (or warp yarns thereof) by applying pressure and heating from outside.

The belt fabricated in such a manner decreases the number of joint parts thereby lessening the generation of cracks at the joint parts. This leads to a considerable, stable elongation of a belt life. Further, since the warp yarns are so composed that the first pair of warp yarns made of the S twist yarn and the Z twist yarn and the second pair of warp yarns made of the Z twist yarn and the S twist yarn are arranged alternately in a belt-width direction, this prevents the belt from meandering thereby resulting in an elongation of the belt life and enhances the quality of the belt.

Explanation is made next about a test conducted with reference to a relation between the number of joint parts of a canvas and a belt life.

Figure 3:
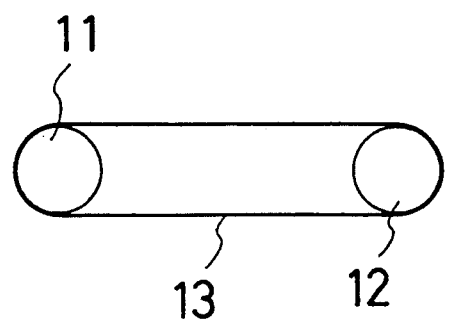
FIG. 3 is a schematic diagram of a testing apparatus.

As shown in FIG. 3, a belt 13 of 280 cm belt length is wound between a driving toothed pulley 11 having 20 teeth and rotating at 8000 rpm and a driven toothed pulley 12 having 20 teeth. The belt 13 is run under the condition of temperature of 100° C. and initial tension of 20 kg/cm$^2$. For the pulley, an H-shaped pulley with 25.4 mm pulley width, 80.85 mm pitch diameter and 79.48 mm outside diameter is used.

A result of the test is shown in a below-mentioned Table 2. In an example of a conventional belt, a crimp yarn of 70d/3 is so used as to fit a stretching direction thereof to a longitudinal direction of the belt. In the Table 2, "Belt life" indicates the period of time till a crack generates at a joint part.

TABLE 2

|  | an example of the present invention | a conventional example | | |
|---|---|---|---|---|
| Canvas width | 1.4 m | 0.85 m | 1.25 m | 1.45 m |
| Number of | 20 | 50 | 50 | 50 |

TABLE 2-continued

|  | an example of the present invention | | a conventional example | |
| --- | --- | --- | --- | --- |
| tested belt |  |  |  |  |
| Number of joint part | 1 | 4 | 3 | 2 |
| Belt life (Hr) | 200 | 110 | 130 | 170 |
| Dispersion of belt life (σn-1) | 25 | 43 | 40 | 36 |

The belt according to the example of the present invention has only one joint part even in case of a long-length belt thereby elongating a belt life as compared with the belt of the conventional example.

Further, explanation is made below about a test conducted with reference to a meandering motion of a belt.

Figure 4:
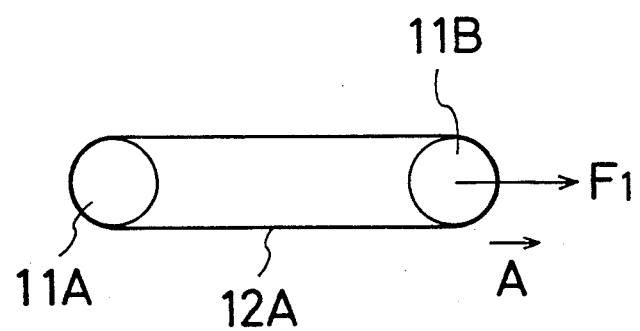
FIG. 4 is a schematic diagram of another testing apparatus.

As shown in FIG. 4, a synchronous belt 12A is wound between a driving toothed pulley 11A and a driven toothed pulley 11B each having same constructions as used in the above-mentioned test about a relation between the number of joint parts of a canvas and a belt life. The synchronous belt 12A is run with the driven toothed pulley 11B tensed at load of F1=140LBS in an A direction. For the synchronous belt 12A, a belt having 48 inches belt length and 0.75 inches belt width is used. A result of the test is shown in the following Table 3.

TABLE 3

|  | a conventional example | an example of the present invention |
| --- | --- | --- |
| Number of tested belt | 20 | 20 |
| meandering motion of belt | 1.0 | 0–0.5 |

It is understood that the example of the present invention shows a high efficiency of preventing a meandering motion as compared with the example of the conventional belt. An amount of meandering motion of the example of the present invention is a half or less than it as compared with that of the conventional example. In the example of the present invention, the amount is approximately 0. The value of 0.5 is caused by non-uniformity of cord arrangement.

SECOND EMBODIMENT

A belt of the present embodiment is applied to a transmission belt.

Figure 5:
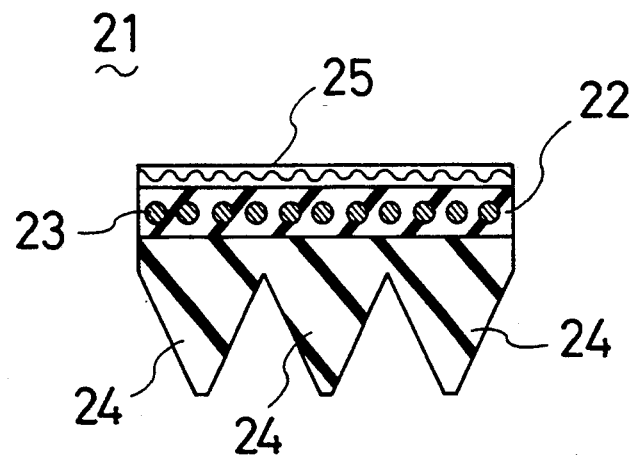
FIG. 5 is a front view showing a part of a V-ribbed belt.

In FIG. 5 showing a schematic structure of a V-ribbed belt, reference numeral 21 designates the V-ribbed belt as a transmission belt, wherein a belt body 22 has tension cords 23 thereinside and plural ribs 24 formed at a lower part thereof and an outer periphery of the belt body 22 are covered with a canvas 25. The canvas 25 is woven by warp yarns and weft yarns, wherein a warp yarn is so composed as to be oriented in accordance with a longitudinal direction of the belt and to have an excellent stretchability as in the canvas 5 of the first embodiment.

The warp yarn of the canvas 25 is composed of a necessary number of spun yarns of yarn number 60-10 gathered and given a final twist at many twisting times of 1500 to 2500 per meter. A first pair of warp yarns made of an S twist yarn and a Z twist yarn and a second pair of warp yarns made of a Z twist yarn and an S twist yarn are arranged alternately in a belt-width direction.

The twisting number of the S twist warp yarn is 10–20 percent more than that of the Z twist warp yarn. The weft yarn is such composed that a necessary number of spun yarns (yarn number 40-7) with less stretchability as well known are gathered and given a final twist at 40 to 200 times per inch. The other construction excluding the above construction in the canvas 25 is same as in the canvas 5 of the first embodiment. Further, material and a weaving method of the canvas is also same as in the canvas 5 of the first embodiment.

The following Table 4 shows an example of the canvas 25 of the present invention together with an example of a conventional canvas.

TABLE 4

|  | an example of the present invention | | a conventional example | |
| --- | --- | --- | --- | --- |
| Warp yarn |  |  |  |  |
| Yarn No. | 30 S/2 × 2 | | 20 S/2 | |
| Denier | 354 d × 2 = 709 d | | 531.5 d | |
| Twist | S twist: 2400 times/m Z twist: 2000 times/m | | S twist: 150 times/10 in. | |
| Weft yarn |  |  |  |  |
| Yarn No. | 20 S/2 | | 20 S/2 | |
| Denier | 531.5 d | | 531.5 d | |
| Twist | S twist: 50 times/10 in. | | S twist: 150 times/10 in. | |
|  | twist yarn | canvas | twist yarn | canvas |
| Strength (kgf) |  |  |  |  |
| warp | 0.52 | 21.5 | 0.70 | 37.0 |
| weft | 0.763 | 32.6 | 0.74 | 41.0 |
| Elongation (%) |  |  |  |  |
| warp | 171.0 | 159.5 | 11.1 | 26.5 |
| weft | 12.6 | 17.0 | 10.8 | 19.0 |
| Thickness (mm) | 0.88-0.92 | | 0.55 | |
| Construction (number/5 cm) | 30 S/2 × 2 × 20 S/2 50 × 80 | | 20 S/2 × 20 S/2 76 × 85 | |

In the above Table 4, the strength of twist yarn shows a value per one yarn of yarn number 30S/2 with reference to the example of the present invention and a value per one yarn of yarn number 20S/2 with reference to the conventional example. The strength of canvas shows a value per 3 cm. A numerator and a denominator in the "Construction" indicate yarn numbers of the warp and weft yarns (and the numbers thereof), and feeding numbers of the warp and weft yarns, respectively.

When a V-ribbed belt is made by using the canvas of the present embodiment, the canvas is wound on a toothed cylindrical mold such that the warp yarns can be oriented in a peripheral direction of the mold, an adhesive rubber sheet is wound thereon, tension-resistance codes are spur therearound, a bottom rubber sheet is wound thereon, and pressure and heating are applied from outside. After the application of pressure and heating, ribs are formed by scraping the bottom rubber, and then a V-ribbed belt is obtained by cutting at a set width dimension.

The belt made in such a manner decreases the number of joint parts as compared with the case using a conventional bias canvas, thereby lessening the generation of cracks and noises at the joint parts. This leads to a considerable elongation of a belt life. Further, since the warp yarns are so composed that the first pair of warp yarns made of the S twist yarn and the Z twist yarn and the second pair of warp yarns made of the Z twist yarn and the S twist yarn are arranged alternately in a belt-width direction, this prevents the belt from meandering and tumbling thereby resulting in an elongation of the belt life and enhances the quality of the belt. In addition, since the canvas of the present embodiment is not required to be a bias canvas, this makes fabricating process of the canvas simplified and presents an advantage of reducing a fabrication cost.

Figure 6:
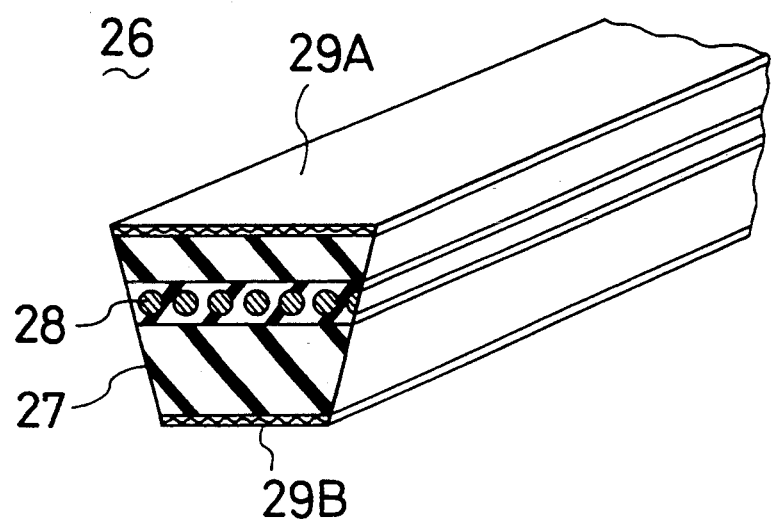
FIG. 6 is a perspective view of a raw-edged V belt.

Explanation is made below about each testing method conducted with reference to the following five points: an adhesive strength of a joint part (Point 1), a meandering motion performance of a belt (Point 2), a level difference of a joint part (Point 3), a crack of a belt bottom (Point 4), and a lateral tumble (Point 5). Each test with reference to the Points 1-3 is conducted by using a V-ribbed belt (with three ribs, 1000 mm belt length and 20 mm belt width) as a transmission belt and each test with reference to the Points 4 and 5 is conducted by using a raw-edged V belt of A type with 35 inches belt length as a transmission belt shown in FIG. 6. In FIG. 6, reference numeral 26 indicates the raw-edged V belt, and 27 indicates a belt body having tension cords 28. The raw-edged V belt 26 has upper and lower canvas layers 29A, 29B which are provided at an upper side and a lower side of the belt body 27 respectively.

A testing method with reference to an adhesive strength of a joint part is as follows.

A canvas undergoes an adhesion treatment by an unvulcanized adhesive rubber to be attached to another canvas, is vulcanized under the condition of the temperature of 148° C. for 30 minutes. Thereafter, peeling resistance is measured when the attached canvases are peeled.

For belts, peeling resistance is measured when a canvas of 1 cm width is peeled from a belt body.

A testing method with reference to a meandering motion performance of a belt is as follows.

Figure 7:
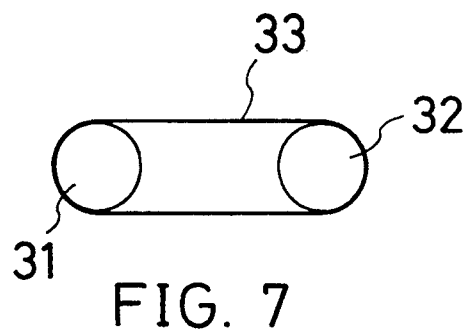
FIG. 7 is a schematic view of a testing apparatus.

As shown in FIG. 7, a belt 33 is wound between a driving ribbed pulley 31 with 95.5 mm diameter and a driven plain pulley 32 with 75 mm diameter and 40 mm pulley length, and is located at a center in a width direction of the driven plain pulley 32. (Under this situation, a distance between a belt edge and a pulley edge in a width direction of the driven plain pulley 32 is 10 mm.) Lateral moving width from the center of the belt 33 and the period of time till the lateral moving begins are measured.

A testing method with reference to a level difference of a joint part is as follows.

After the attached canvases are vulcanized in the abovementioned testing method with reference to an adhesive strength of a joint part, the joint part is taken apart and the level difference of the joint part is directly measured with a scale.

A testing method with reference to a crack of a belt bottom is as follows.

Figure 8:
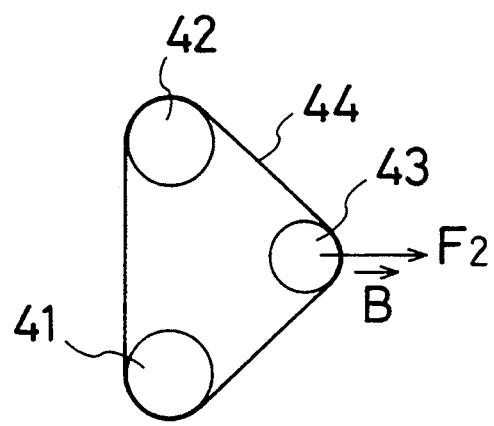
FIG. 8 is a schematic view of another testing apparatus.

As shown in FIG. 8, a belt 44 is wound among a driving pulley 41 which has 125 mm diameter and rotates at 4900 rpm, a driven pulley 42 with 125 mm diameter and an idler pulley 43 with 70 mm diameter, thereby forming three shaftings. With a load of F2=85 kgf applied to the idler pulley 43 in a B direction, the period of time till a crack generates at a joint part of a canvas is measured.

A testing method with reference to a lateral tumble is as follows.

Figure 9:
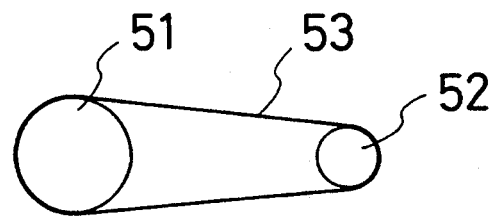
FIG. 9 is a schematic view of another testing apparatus.

As shown in FIG. 9, a belt 53 is wound between a pulley 51 with 140 mm diameter and a pulley 52 with 60 mm diameter. With the peripheral velocity of the pulley 51 varied, the peripheral velocity at which a lateral tumble of the belt 53 generates is measured.

Results of the above tests are shown in the following Table 5. In a conventional example, a bias canvas composed of warp yarns and weft yarns each yarn number of which is 20S/2 is so used as to fit a stretching direction thereof to a longitudinal direction of the belt.

TABLE 5

| | an example of the present invention | a conventional example |
| --- | --- | --- |
| Adhesive strength of joint part | | |
| Canvas (kg/in.) | more than 8.0 (canvas break) | 6.0 |
| Belt (kg/cm) | yarn break (complete adhesion) | 3.5 |
| Meandering motion performance of belt | | |
| Lateral moving width | small | large |
| Lateral moving beginning time (second) | 0 | 0–50 |
| Level difference of joint part (cord going-down) (mm) | 0 | 0.2–0.4 |
| Crack of belt bottom | 1.5 (one joint part) | 1.0 (two joint parts) |
| Lateral tumble (m/minute) | 1.3 | 1.0 |

In the "Crack of belt bottom" of the above Table 5, the value of the example of the present invention is exponentially displayed based on that the period of time till a crack generates at a joint part of the conventional example is set to a standard value of 1.0. In the "Lateral tumble" of the Table 5, the value of the example of the present invention is exponentially displayed based on that the peripheral velocity at which the lateral tumble generates at the conventional example is set to a standard value of 1.0.

I claim:
1. A belt comprising:
a belt body; and
a canvas composed of a warp yarn and a weft yarn for covering said belt body in such a manner that the warp yarn accords with a longitudinal direction of said belt,
wherein the warp yarn of said canvas is composed of a necessary number of spun yarns or filament yarns gathered and given a final twist at 1500 to 3000 times per meter,
the weft yarn is composed of spun yarns or filament yarns,
said canvas is such woven that a first pair of warp yarns made of an S twist yarn and a Z twist yarn and a second pair of warp yarns made of a Z twist yarn and an S twist yarn are arranged alternately in a belt-width direction, and
said canvas is formed so as to have a large stretchability in the longitudinal direction of said belt.
2. The belt according to claim 1, wherein said belt is a synchronous belt having tension cords provided inside of said belt body and tooth parts formed at regular intervals at a lower part of said belt body.
3. The belt according to claim 1, wherein said belt is a V-ribbed belt having tension cords provided inside of said belt body and plural ribs formed at a lower part of said belt body, and the warp yarn of said canvas is composed of a necessary number of spun yarns of 60 to 10 yarn number gathered and given a final twist at 1500 to 2500 times per meter.

4. The belt according to claim 3, wherein the S twist warp yarn is twisted approximately 10 to 20 percent more than the Z twist warp yarn.

5. The belt according to claim 4, wherein the weft yarn of said canvas is composed of a necessary number of spun yarns of 40 to 7 yarn number gathered and given a final twist at 40 to 200 times per inch.

* * * * *